United States Patent
Okaniwa et al.

(10) Patent No.: US 10,309,001 B2
(45) Date of Patent: Jun. 4, 2019

(54) ALUMINUM ALLOY FOR MICROPOROUS HOLLOW MATERIAL WHICH HAS EXCELLENT EXTRUDABILITY AND GRAIN BOUNDARY CORROSION RESISTANCE, AND METHOD FOR PRODUCING SAME

(71) Applicants: NIPPON LIGHT METAL COMPANY, LTD., Tokyo (JP); OKB CO., LTD., Tokyo (JP)

(72) Inventors: Shigeru Okaniwa, Shizuoka (JP); Meitoku Ogasawara, Shizuoka (JP); Takao Otaki, Shizuoka (JP); Yusuke Seki, Shizuoka (JP); Yutaka Kato, Gunma (JP)

(73) Assignees: NIPPON LIGHT METAL COMPANY, LTD., Tokyo (JP); OKB CO., LTD., Tokyo (JP)

( * ) Notice: Subject to any disclaimer, the term of this patent is extended or adjusted under 35 U.S.C. 154(b) by 486 days.

(21) Appl. No.: 14/390,515

(22) PCT Filed: Mar. 28, 2013

(86) PCT No.: PCT/JP2013/059284
§ 371 (c)(1),
(2) Date: Oct. 3, 2014

(87) PCT Pub. No.: WO2013/150957
PCT Pub. Date: Oct. 10, 2013

(65) Prior Publication Data
US 2015/0167137 A1    Jun. 18, 2015

(30) Foreign Application Priority Data
Apr. 5, 2012   (JP) ................. 2012-086725

(51) Int. Cl.
*C22F 1/04* (2006.01)
*C22C 21/00* (2006.01)
(Continued)

(52) U.S. Cl.
CPC ............ *C22F 1/057* (2013.01); *B32B 15/016* (2013.01); *C22C 21/00* (2013.01); *C22C 21/12* (2013.01);
(Continued)

(58) Field of Classification Search
CPC .................................. C22C 21/00; C22F 1/04
See application file for complete search history.

(56) References Cited

U.S. PATENT DOCUMENTS

2008/0050269 A1 *   2/2008   Tanaka .................... C22C 21/00
                                                    420/537

FOREIGN PATENT DOCUMENTS

JP   63-157830 A   6/1988
JP   63-238246 A   10/1988
(Continued)

OTHER PUBLICATIONS

International Search Report dated May 28, 2013 issued in corresponding PCT/JP2013/059284 application (pp. 1-2).
(Continued)

*Primary Examiner* — George Wyszomierski
*Assistant Examiner* — Janell C Morillo
(74) *Attorney, Agent, or Firm* — Rankin, Hill & Clark LLP (57) ABSTRACT

An aluminum alloy for microporous hollow shape material use constituted by an aluminum alloy which has excellent corrosion resistance and extrudability which keeps down the content of Cu which poses a problem in intergranular corrosion resistance, which maintains the natural potential noble, which adds transition metals which do not obstruct
(Continued)

the extrudability is provided, that is, an aluminum alloy which has a chemical composition which contains, by mass %, Fe: 0.05 to 0.20%, Si: 0.10% or less, Cu: 0.15 to 0.32%, Mn: 0.08 to 0.15%, Zr: 0.05% or less, Ti: 0.06 to 0.15%, Cr: 0.03% or less, and balance: Al and unavoidable impurities and has an amount of gas in the alloy billet of 0.25 cc/100 g or less, and a method of production of an aluminum alloy which, produces a DC cast billet.

20 Claims, 4 Drawing Sheets

(51) Int. Cl.
      *C22F 1/057*      (2006.01)
      *C22F 1/00*       (2006.01)
      *B32B 15/01*      (2006.01)
      *C22C 21/12*      (2006.01)
      *C22C 21/14*      (2006.01)
      *F28F 21/08*      (2006.01)
      *F28D 1/053*     (2006.01)
      *F28F 1/02*       (2006.01)
      *F28F 1/12*       (2006.01)
(52) U.S. Cl.
      CPC ................ *C22C 21/14* (2013.01); *C22F 1/00* (2013.01); *C22F 1/04* (2013.01); *F28F 21/084* (2013.01); *F28D 1/05383* (2013.01); *F28F 1/022* (2013.01); *F28F 1/126* (2013.01); *F28F 2255/16* (2013.01)

(56) References Cited

FOREIGN PATENT DOCUMENTS

| JP | 05-287424 A | * | 11/1993 |
| JP | 2004-339559 A | * | 12/2004 |
| JP | 2005-256166 A | | 9/2005 |
| JP | 2008-50657 A | | 3/2008 |
| JP | 2009-46705 A | | 3/2009 |
| JP | 2011-7385 A | | 1/2011 |
| WO | 91/14794 A1 | | 10/1991 |
| WO | 2012/098991 A1 | | 7/2012 |

OTHER PUBLICATIONS

English Translation Abstract of JP 63-157830 published Jun. 30, 1988.
English Translation Abstract of JP 63-238246 published Oct. 4, 1988.
English Translation Abstract of JP 2005-256166 published Sep. 22, 2005.
English Translation Abstract of JP 2008-050657 published Mar. 6, 2008.
English Translation Abstract of JP 2009-046705 published Mar. 5, 2009.
English Translation Abstract of JP 2011-007385 published Jan. 13, 2011.

* cited by examiner

EXAMPLE OF SURFACE DEFECTS: STRIPPING

EXAMPLE OF SURFACE DEFECTS: STREAKING

ALUMINUM ALLOY FOR MICROPOROUS HOLLOW MATERIAL WHICH HAS EXCELLENT EXTRUDABILITY AND GRAIN BOUNDARY CORROSION RESISTANCE, AND METHOD FOR PRODUCING SAME

TECHNICAL FIELD

The present invention relates to an aluminum allow excellent in extrudability and intergranular corrosion resistance which is used for the extruded microporous hollow flat tubes which form parts of an aluminum heat exchanger, for example, the condenser, evaporator, intercooler, etc., and a method for producing the same.

BACKGROUND ART

Figure 1:
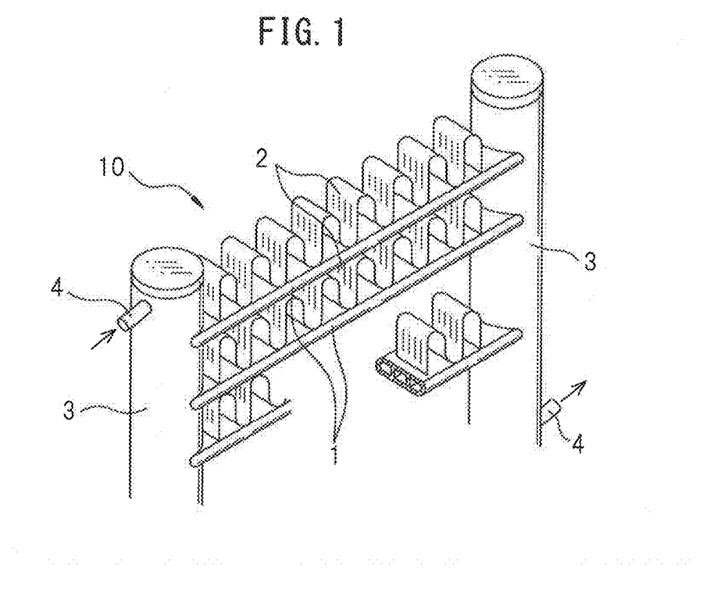
FIG. 1 explains a schematic structure of a general condenser for car air-conditioner use.
Figure 2:
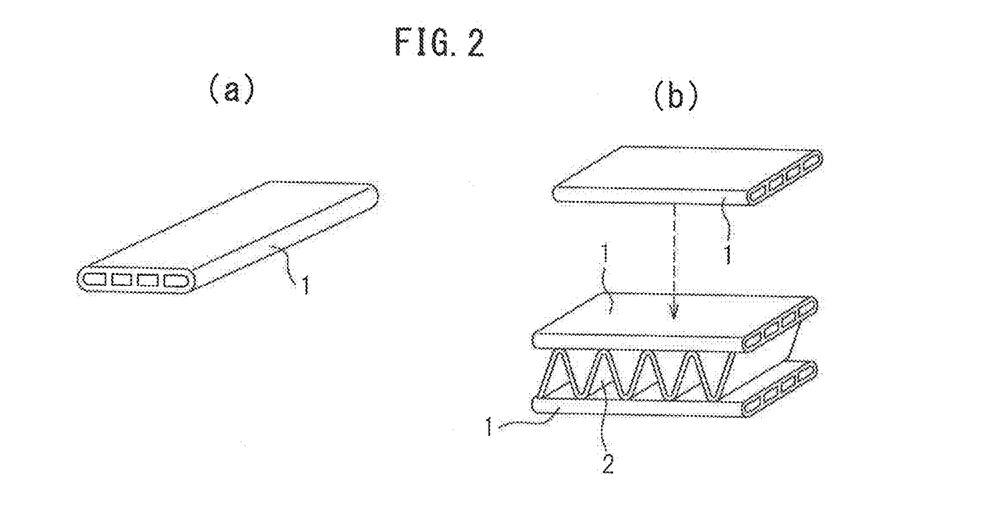
FIG. 2 explains a schematic structure of a flat tube and a heat with the tube installed therein.

In general, an aluminum heat exchanger, for example, a condenser for car air-conditioner use such as shown in FIG. 1, is comprised of flat tubes 1 which form the flow paths of a coolant (FIG. 2(a)), corrugated fins 2 which exchange heat with air, tank parts constituted by header pipes 3, and inlet and outlet members 4, has means (brazing material) by which members in contact with each other are brazed, and is brazed by using a noncorrosive flux (FIG. 2(b)).

An aluminum heat exchanger is required to have a high durability. The members which form it, that is, the extruded flat tubes, are naturally required to have corrosion resistance, strength, brazeability, extrudability, etc.

On the other hand, from the viewpoint of the need for reducing the weight of the heat exchanger and economy, the flat tubes 1 have to be made thin by complicated microporous hollow structures such as shown in FIG. 2. For this reason, an aluminum alloy which is excellent in extrudability is being demanded.

In particular, regarding corrosion resistance, a current theme is the prevention of early penetration defects due to intergranular corrosion which will result in the coolant which is sealed inside the flat tubes flowing out.

Figure 3:
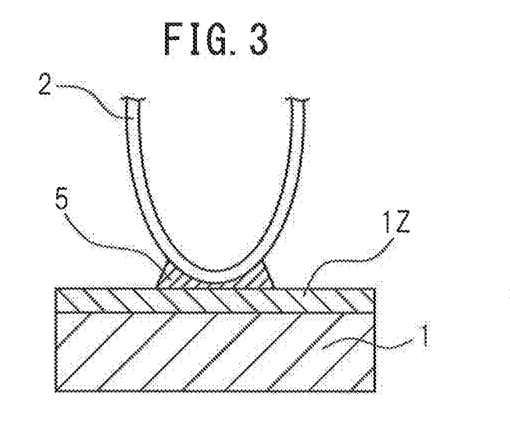
FIG. 3 explains a sacrificial corrosion action of a Zn diffused layer.

As the broadly used method of sacrificial corrosion, as shown in FIG. 3, there is the method of coating metal Zn on the surface of a flat tube 1, heating it, then forming a Zn diffused layer 1Z at the surface layer part. The Zn diffused layer 1Z which is formed is utilized for sacrificial corrosion. Note that, in the illustrated example, the flat tubes 1 and fins 2 are bonded on the Zn diffused layer 1Z by brazed bonded parts 5.

However, with the method of coating metal Zn on the flat tube surface in this way, the concentration of Zn at the Zn diffused layer becomes higher. Conversely, the problem arises that the Zn diffused layer parts including the joints with the fins are consumed early and therefore the performance of the heat exchanger is reduced.

In this way, various alloys have been proposed for extruded flat tubes for which extrudability and intergranular corrosion resistance are demanded, but no solution fully satisfying the demands has yet been achieved.

For example, PLTs 1 and 2 propose aluminum alloys which are improved in extrudability and corrosion resistance. These are based on pure aluminum and deliberately add Cu and Fe to maintain the strength of the material while improving the corrosion resistance and extrudability of the aluminum matrix.

CITATIONS LIST

Patent Literature

PLT 1: Japanese Patent Publication No. 60-238438A
PLT 2: Japanese Patent Publication No. 5-222480A

SUMMARY OF INVENTION

Technical Problem

Although the alloys proposed in PLTs 1 and 2 are indeed improved in extrudability and corrosion resistance, the improvement is still insufficient from the viewpoint of the extrudability at higher extrusion ratios of a thin hollow material with concavities and convexities provided on the inner surface of the tube and also the corrosion resistance, in particular, the intergranular corrosion resistance.

As explained above, in general, the method of sacrificial corrosion has been employed as the means for protecting against corrosion of the flat tubes of a heat exchanger. The aluminum alloys proposed in the above PLTs 1 and 2 can be said to be alloys which are considerably noble in terms of potential with a natural potential of about −0.7 VvsSCE, so there is no problem with use at a portion at which the sacrificial corrosion method is employed.

However, the alloys are comprised of pure Al with Cu added. Al—Cu intermetallic compounds are formed along the crystal grain boundaries, so corrosion of the crystal grain boundaries is liable to be promoted. That is, after the Zn diffused layer is consumed, when measures to reduce the Zn diffused layer are taken, or at portions of the heat exchanger where the sacrificial corrosion method is not applied, corrosion of the flat tube itself is liable to proceed.

The present invention was made to solve this problem and has as its object the provision of an aluminum alloy for microporous hollow shape material constituted by an aluminum alloy which keeps down the content of Cu which poses a problem in intergranular corrosion resistance, which maintains the natural potential noble, which suppresses the occurrence and progression of pitting and intergranular corrosion by adding Ti, Mn, Zr, Cr, and other transition metals which solidify by peritectic solidification, and which further improves the extrudability of a thin hollow material by a high extrusion ratio by keeping down the gas content.

Solution to Problem

To achieve the above object, the aluminum alloy which is excellent in extrudability and intergranular corrosion resistance for microporous hollow shape material of the present invention has a chemical composition which consists of Fe: 0.05 to 0.20 mass %, Si: 0.10 mass % or less, Cu: 0.15 to 0.32 mass %, Mn: 0.08 to 0.15 mass %, Zr: 0.05 mass % or less, Ti: 0.06 to 0.15 mass %, Cr: 0.03 mass % or less, and the balance: Al and unavoidable impurities and, furthermore, to prevent the material defect of air bubbles from generating during extrusion, reducing the gas content of the material (billet) after alloy casting to 0.25 cc/100 g or less, preferably 0.20 cc/100 g or less, so as to prevent surface blisters of the extruded material or remarkable streak defects which detract from the smoothness.

The aluminum alloy of the present invention may contain V: 0.05 mass % or less for refining the structure of the cast billet and extruded material.

The aluminum alloy for microporous hollow shape material is obtained by subjecting a DC cast billet of an aluminum alloy having the above-described chemical composition to a homogenization treatment comprising: heating the DC cast billet to 550 to 590° C. at a rate of 80° C./h or less and holding it for 0.5 to 6 hours; and either holding it at 450 to 350° C. in range for 0.5 to 1 hour or cooling it down to 200° C. or less at a cooling rate of 50° C./h.

Then, after reheating the homogenization-treated billet to 450 to 550° C., by extruding it to a desired shape by a working degree of an extrusion ratio of 30 to 1000, an aluminum alloy microporous hollow shape material excellent in intergranular corrosion resistance can be obtained.

If necessary, the homogenization-treated billet may be surface machined by 0.1 to 1 mm or so of its outer circumferential diameter, and then be extruded.

Advantageous Effect of Invention

The aluminum alloy for microporous hollow shape material excellent in extrudability and intergranular corrosion resistance, according to the present invention, is fundamentally based on pure aluminum and has the contents of Fe, Cu, Mn, and Cr kept low in consideration of the high temperature deformation resistance of the material (billet), and therefore has good extrudability. While kept low, the required amounts of Fe, Cu, Mn, Cr, etc. are contained, so the alloy has the strength and corrosion resistance for a microporous hollow shape material for forming a heat exchanger.

In particular, in the alloy of the present invention, the content of Cu is limited to 0.15 to 0.32 mass % in range and therefore, formation of Al—Cu-based intermetallic compounds is controlled to extremely minimize the tendency of intergranular corrosion. Further, by including a suitable amount of Ti, the dispersion of Ti at the grain boundaries or matrix stops the progression of intergranular corrosion and improves the corrosion resistance.

Addition of suitable amounts of Mn, Zr, and Cr, V, etc. makes noble the potential of the matrix, in particular the potential of the region with sparse dispersion of Ti, further promotes the effect of addition of Ti, and is also greatly effective for preventing intergranular corrosion of course and also pitting and general corrosion.

DESCRIPTION OF EMBODIMENTS

As explained above, the aluminum alloy for extrusion use proposed in PLT 2 is an alloy which is excellent in extrudability, but on the other hand, the contained Cu is likely to form Al—Cu-based intermetallic compounds at the crystal grain boundaries to cause susceptibility to intergranular corrosion.

Therefore, the inventors engaged in in-depth studies to discover an aluminum alloy in which the content of Cu is reduced, the mechanical property comparable to that of the aluminum alloy for extrusion use proposed in PLT 2 etc. is achieved, the extrudability if improved by reducing the pressure required for extrusion, defects during extrusion such as air bubbles and stripping are further prevented, and there is no fears of intergranular corrosion.

As a result, they discovered that if keeping down the Cu content to 0.15 to 0.32 mass % in range, suitably adjusting the contents of other elements of Fe, Si, Mn, Zr, Cr, etc., and adding a suitable amount of Ti, the above problem of intergranular corrosion resistance can be improved and that by restricting the amount of gas in the extruded material and by face milling the skin of the outer circumference of the billet surface when extruding such a produced billet, it is possible to suppress the formation of incidental extrusion defects due to blisters, entrainment, etc. Details will be explained below:

The aluminum alloy for microporous hollow shape material which is excellent in extrudability, pitting resistance, and intergranular corrosion resistance of the present invention has a chemical composition which contains Fe: 0.05 to 0.20 mass %, Si: 0.10 mass % or less, Cu: 0.15 to 0.32 mass %, Mn: 0.08 to 0.15 mass %, Zr: 0.05 mass % or less, Ti: 0.06 to 0.15 mass %, and Cr: 0.03 mass % or less and, furthermore, in accordance with need, contains V: 0.05 mass % or less and has a balance of Al and unavoidable impurities and has a gas content in the extruded material made 0.25 cc/100 g or less. These objects and the actions and reasons of limitation of the ingredients and the effects of the restriction of gas and removal of the skin at the outer circumference of the billet will be explained. Below, the indications "%" are all mass %.

Fe: 0.05 to 0.20%

Fe has the action of improving the strength of a pure aluminum alloy and the effect of prevention of cracking at the time of cracking and refining the cast structure. This action is manifested by inclusion of 0.05% or more, but the greater the content over 0.20%, the more Al—Fe compounds are formed at the crystal grain boundaries at the time of casting and the greater the liability of having a detrimental effect on the pitting corrosion resistance and intergranular corrosion resistance and the greater the liability of stripping, cracking, etc. at the time of extrusion, so the worse the extrudability. Therefore, the upper limit value of Fe was made 0.20%.

Si: 0.10% or Less

Si is an unavoidable impurity which enters from the Al matrix, but keeps down the formation of Al—Fe—Si compounds which have a detrimental effect on the workability. Further, the excess Si particles become starting points of pit-like corrosion and form compounds with the additive elements of Mn, Zr, etc. to thereby reduce their effects. Therefore, the upper limit value was made 0.10%.

Cu: 0.15 to 0.32%

Cu is an element which is effective for suppressing deep pitting of the Al base material. An effect is recognized by a content of 0.15% or more. However, if the content becomes greater, the Al—Cu compound $CuAl_2$ is formed at the grain boundaries, intergranular segregation cannot be completely eliminated by homogenization, and intergranular corrosion is promoted. Further, to increase the extrusion pressure, the Cu content was made 0.15 to 0.32%.

Mn: 0.08 to 0.15%

Mn has the action of improving the corrosion resistance and strength, in particular the high temperature strength. These actions are manifested by inclusion of 0.030% or more, but to improve the potential of the Al matrix and stabilize and suppress the propagation of corrosion, addition of 0.08% or more of Mn is preferable. Further, to raise the high temperature strength, this has the great role of preventing large softening at the time of brazing and enabling the rigidity of the structure to be maintained. On the other hand, since the high temperature strength is high, the working pressure at the time of extrusion becomes large and the extrudability falls. Further, the Al—Mn-based intermetallic compound $Al_6Mn$ is formed along the crystal grain boundaries and the intergranular corrosion resistance is liable to be detrimentally affected. Therefore, the Mn content was given an upper limit of 0.15%.

Zr: 0.05% or Less

Zr increases the high temperature strength of the material by a composite effect with Mn etc. even if added in a fine amount. However, with over 0.05% addition of Zr, formation of compounds with other elements is affected, the effect is decreased, and the extrusion pressure increases at the time of extrusion of a thin material. Further, addition of 0.05% or less of Zr has the effect of making the matrix noble and reducing the intergranular corrosion together with the pitting corrosion. Further, if intending this effect alone, addition of 0.02 to 0.05% of Zr is preferable.

Ti: 0.06 to 0.15%

Ti has the action of refining the cast structure and suppressing the intergranular corrosion of the extruded material by the state of distribution of the Ti element. This action is effectively manifested by inclusion of 0.06% or more. However, if the content becomes greater, the coarse intermetallic compound $TiAl_3$ is formed and causes the extrudability to worsen and makes the unevenness of Ti distribution increase, so the upper limit was made 0.15%.

V: 0.05% or Less

The V and V compounds which crystallize at the time of casting are dispersed laminarly due to extrusion and have the action of preventing the progression of intergranular corrosion, so are included according to need. However, if the content becomes greater, the extrudability is worsened, so the upper limit was made 0.05%. The composite addition of Ti and V causes the effect of suppression of intergranular corrosion to become greater, but if the contents become too great, the extrudability is worsened, so the upper limit of the total amount of these was made 0.20%.

Cr: 0.03% or Less

Cr has the action of suppressing coarsening of the extruded structure. This action is effectively manifested by inclusion of 0.01% or more. However, if included in a large amount, the extrudability is worsened, so the upper limit was made 0.03%.

The rest are unavoidable impurities.

Gas Content: 0.25 cc/100 g or Less

The "gas" is the oxygen, hydrogen, and nitrogen which enter from the atmosphere at the stage of production of the alloy, that is, melting and casting. In the results of gas analysis (Lansley method), hydrogen ($H_2$) gas accounts for 99% or more. What the Al alloy contains is mainly hydrogen gas. To remove this gas ($H_2$), generally degassing is performed, but by controlling the casting temperature after melting and degassing, the gas is stably made 0.25 cc/100 g or less and the problems in the material when the amount of gas is large, that is, the oxide film and inclusions, are lowered. Further, the defects at the time of extrusion due to the entry of gas, that is, blisters (air bubbles) of the surface of the material, are prevented or extrusion defects starting from foreign matter (oxide film or inclusions) (stripping and cracking) and starting points of corrosion are reduced to thereby give rise to the effect of eliminating issues not solvable by just the ingredients, that is, the liability of the drop in extrudability or drop in corrosion resistance.

Below, the method of production of the aluminum alloy for microporous hollow shape material of the present invention will be explained.

The aluminum alloy for microporous hollow shape material which is excellent in extrudability and intergranular corrosion resistance according to the present invention is smelted by usual means, but is provided as a billet of the desired shape by the general casting method of semicontinuous casting where the melt treatment conditions, including degassing after melting, and the casting conditions are suitably set.

To effectively utilize the ingredients of the alloy in the obtained aluminum alloy billet, it is necessary to heat the cast billet at a high temperature to make the elements forming the intermetallic compounds which precipitated at the time of casting redissolve in the matrix and eliminate the distribution of concentration of the added elements and, furthermore, refine the compounds present as crystal products at the time of casting by homogenization. As this homogenization, heat treatment at 550 to 590° C. for 0.5 hour to 6 hours is preferable.

The aluminum alloy of the present invention is an alloy comprised of a base of pure Al, restricted in Fe and Si, having Cu, Mn, Cr, Zr, and Ti added, and restricted in the amount of gas.

A billet which is obtained by casting has to be held at 550° C. or more for 0.5 hour or more or else the Al—Fe—Si-based compounds or Al—(Fe, Mn)—Si-based compounds cannot be made to finely disperse and defects arise when extruding the billet by a high working degree. Further, to cause compounds of other elements such as Cu, Cr, Mn, Zr, etc. to dissolve in the Al metal or be present as fine compounds, the billet has to be held at 550° C. or more for 0.5 hour or more.

On the other hand, if heating at a temperature over 590° C. for 0.5 hour or more, the Fe, Si, and Cu increasingly dissolve, so this is preferable, but the amounts of dissolution of Mn, Cr, and Zr become greater, the working pressure at the time of subsequent extrusion ends up becoming increased, and, furthermore, the tendency for the structure of the extruded material to become a coarse recrystallized structure becomes greater.

Further, economically, 6 hours or less is preferable. Long homogenization treatment results in the cost of the billet becoming higher and increased oxidation of the billet surface, so a preferred quality is not obtained. The suitable temperature of the homogenization treatment is 570° C.±10° C. Economically, fast heating and fast cooling are desirable, but in an alloy which contains Mn, Cr, and Zr, if the temperature is raised to the homogenization treatment temperature by a speed of 80° C./h, large amounts of Mn and Cr will dissolve in the matrix. A suitable temperature elevation rate is used to maintaining the state as cast (presence of coarse compounds and large amount of dissolution) and sufficient time is taken for dispersion until the homogenization temperature so as to make the coarse compounds of Al—Fe, Al—Fe—Si, form solid solutions. On the other hand, the p Cr, Mn, and Zr which had formed solid solutions are made to precipitate as Al—Fe(Mn,Cr,Zr)—Si-based compounds and Al—Zr and Al—Mn compounds to improve the structure of the billet, the extrusion pressure is lowered, and the structure of the extruded tube is refined.

On the other hand, by holding the billet at a high temperature, the Mn, Cr, and Zr compounds dissolve. These have to be made to reliably precipitate as suitable compounds. For this, the billet has to be held at 450 to 350° C. in range for 0.5 to 1 hour or has to be cooled by a gentle cooling rate of 50° C./h down to 200° C. or less. If off from this condition, Mn, Cr, and Zr remain in the matrix in solid solution. Only small amounts precipitate at the time of heating before the later step of extrusion, so the extrusion pressure becomes high and the workability falls. A material which is obtained by extruding a billet which is obtained by such homogenizing treatment becomes uniform in structures at the surface and inside of the extruded material, and it is possible to suppress coarsening of the crystal grains due to hot working.

The homogenization was performed to render the structure of the cast billet suitable, but the outer circumferential surface of the billet is uneven. Furthermore, an oxide film is formed. For this reason, depending on the extrusion die structure, extrusion conditions, etc., sometimes, during extrusion, the outer circumference of the billet flows into the extruded material, in particular the hollow shape, in a complicated manner. The oxide film etc. at the inflowing outer circumferential part of the billet form surface defects of the shape materials such as stripping and air bubbles which form extrusion defects, lower the smoothness of the surfaces of the shape materials, and result in deep streak defects. To prevent these defects, it is necessary to remove the oxide film and dirt on the outer circumference of the billet. Face milling is most effective. The face milling is preferably performed to 0.1 to 1 mm of the outer circumferential diameter of the billet.

To treat a billet which was obtained by casting the alloy composition of the present invention by predetermined homogenization and obtain the targeted microporous hollow extruded shape material, it is necessary to heat that billet at 450° C. to 550° C. and extrude it by a working degree of an extrusion ratio of 30 to 1000.

If less than 450° C., the extrusion ratio of the microporous hollow shape material is high, so the limit capacity of the extrusion pressure of the extruder (usually 210 kg/cm$^2$) ends up being exceeded and extrusion becomes impossible. Even if able to be extruded, stripping and other defects occur at the inside surface of the microporous hollow material and further the shape and dimensions become outside the tolerances.

Further, with heating at a temperature as high as over 550° C., the extrusion can be performed easily, but the extrusion ratio and extrusion speed are high, so during the extrusion, the temperature of the shape material becomes high, a large amount of stripping or local melting occurs at the surface and inside of the microporous hollow material, and the required shape cannot be maintained.

Further, if the extrusion ratio is so small as to not reach 30, the characteristic feature of the present patent of the effect of Ti (state where Ti is present inside the shape material in a layer along the extrusion direction) becomes hard to obtain. Conversely, if designing the die so that the extrusion ratio exceeds 1000, the die-making and selection of extrusion conditions become difficult and the extrusion itself becomes impossible.

Examples

As the fluid for heat exchange use, a Freon-based coolant is used. For this reason, as the material which is used for a heat exchanger, an alloy which is excellent in corrosion resistance, strength, and brazeability and further which can be extruded into the main members of parts for assembly of a heat exchanger, that is, 0.5 to 2 mm or so microporous hollow shape materials (flat tubes), is being demanded.

Therefore, the various types of aluminum alloys which have the chemical compositions which are shown in Table 1 were studied for extrudability, corrosion resistance, strength, and brazeability.

Figure 4:
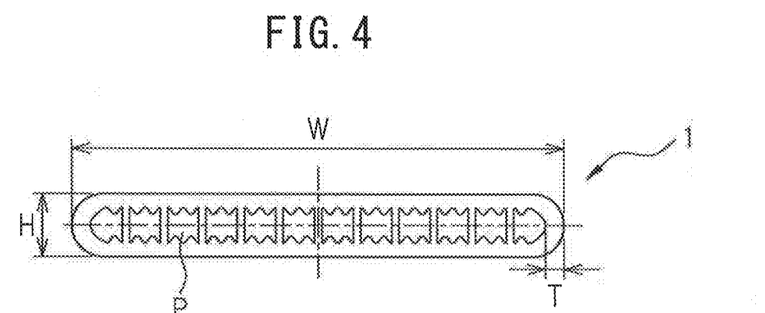
FIG. 4 shows a cross-sectional shape of a hollow flat tube for heat exchanger use which is fabricated in the examples.

First, the various types of aluminum alloys which have the chemical compositions which are shown in Table 1 were melted and formed into castings of 6 to 10 inch diameters and lengths 2 to 6 meters (billets). These castings were homogenized under conditions holding them at 550 to 590° C. for 0.5 to 6 hours, then were heated to 460 to 550° C. and were extruded by extrusion ratio 30 to 1000 dies for forming thin shape materials to obtain hollow flat tubes 1 for heat exchanger use which have cross-sectional shapes which are shown in FIG. 4, widths (W) 16.2 mm, thicknesses (H) 1.93 mm, and 12 bores (P) of wall thicknesses (T) of 0.35 mm.

Further, the extruded samples were investigated at the outer surfaces and inner surfaces of the extruded material right after extrusion. Further, as the quality of the material, the corrosion resistance, strength, and brazeability were examined. The results are shown at the right in Table 1 corresponding to the ingredients.

Note that, the strength was judged by the room temperature strength of the annealed material. Based on the 65 MPa of pure Al, examples with a strength over 90 MPa were judged as "very good", examples with a strength of 60 to 90 MPa in range were judged as "good", and examples with a strength of less than 60 MPa were judged as "poor".

The corrosion resistance was judged by evaluating the presence and degree of progression of intergranular corrosion from observation of the microstructure after a corrosion test by a salt spray test (JIS 22371) of 5000 hours. Examples where intergranular corrosion was not recognized much at all were evaluated as "very good", examples with exfoliation corrosion of 100 μm or less were evaluated as "good", and examples with exfoliation corrosion of 300 μm or more were judged as "poor".

The extrudability was judged by the load state of the extrusion pressure at the time of extrusion and the surface defects of the flat tubes (stripping, skin roughness, relief concavities/convexities and stripping at outer circumference and inside surface of products). Examples with no surface defects at all were evaluated as "very good", examples with slight defects, but not a problem in use were evaluated as "good", and examples with many surface defects and unable to be used were evaluated as "poor".

In brazeability, the invention examples and comparative examples were almost equivalent. No differences were found. As the overall evaluation, passing examples which can be used as hollow flat tubes for heat exchanger use were evaluated as "good" and failing examples which cannot be used were evaluated as "poor".

Figure 5:
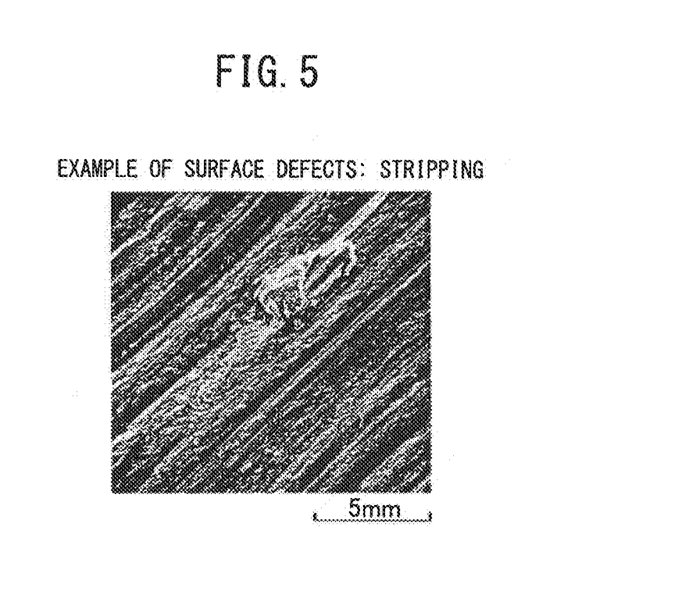
FIG. 5 explains surface defects of an extruded material in the case of a large gas content in the examples.

FIG. 5 shows an enlarged photograph of a stripping defect which occurs when the gas content etc. is large. If much such minor strippings occur, they are liable to form starting points of corrosion.

Figure 6:
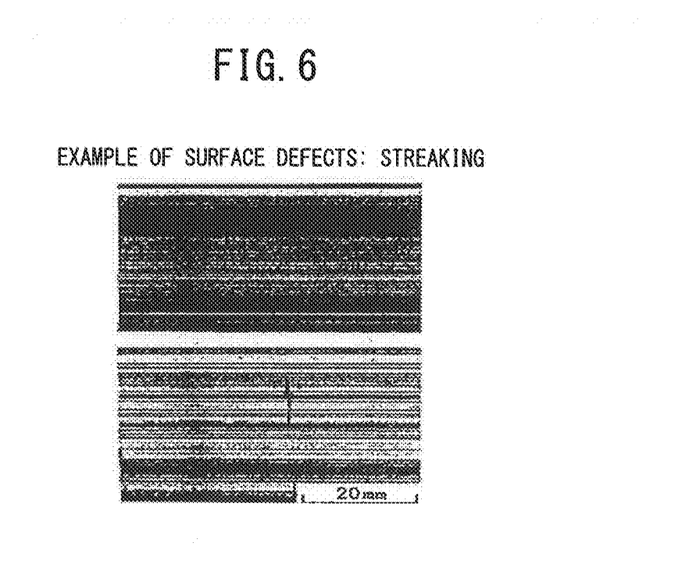
FIG. 6 is a view which shows streak defects in the examples.

FIG. 6 shows the surface defects constituted by fine concavities/convexities called "streak defects". The concavities/convexities are liable to result in progression of corrosion along with minor stripping.

Since the above evaluation criteria were used for the tests for evaluation by the amount of gas, when the amount of gas is 0.21 cc/100 g as shown in Table 2, the ingredients of billets of shape materials passing the corrosion resistance, extrudability test, etc. are used. With these alloy ingredients, extrusion tests were run by test materials changed in amounts of gas such as in Table 3. The results shown at the right in Table 3 were obtained.

Clearly, at 0.25 cc/100 g or more, the surface deteriorates and a clear difference occurs perception wise.

melted, degassed, refined, filtered, and otherwise treated by predetermined melt treatment, then were cast by the DC casting method at a casting temperature of 680° C. or more in temperature to diameter 210 mm billets.

After this, the billets were held at 590° C. in temperature for 4 hours, then cooled as homogenization to obtain 4000 mm length billets. The temperature elevation to 590° C. and

TABLE 1

Chemical Composition of Test Materials (Mass %) and Results of Various Evaluations of Test Materials

| No. | Fe | Si | Cu | Mn | Cr | Ti | Zr | V | Strength | Corrosion resistance | Brazability | Extrudability | Overall evaluation |
|---|---|---|---|---|---|---|---|---|---|---|---|---|---|
| 1 | 0.05 | 0.05 | 0.15 | 0.08 | 0.01 | 0.06 | 0.02 | | Good | Good | Good | Very good | Good |
| 2 | 0.05 | 0.08 | 0.20 | 0.08 | 0.01 | 0.06 | 0.02 | | Good | Good | Good | Very good | Good |
| 3 | 0.20 | 0.08 | 0.20 | 0.08 | 0.01 | 0.06 | 0.02 | | Good | Good | Good | Very good | Good |
| 4 | 0.20 | 0.10 | 0.20 | 0.10 | 0.01 | 0.06 | 0.03 | | Good | Very good | Good | Very good | Good |
| 5 | 0.20 | 0.10 | 0.20 | 0.10 | 0.03 | 0.06 | 0.03 | | Very good | Very good | Good | Good | Good |
| 6 | 0.20 | 0.10 | 0.31 | 0.10 | 0.01 | 0.08 | 0.03 | | Very good | Very good | Good | Very good | Good |
| 7 | 0.20 | 0.10 | 0.31 | 0.15 | 0.01 | 0.08 | 0.03 | | Very good | Very good | Good | Very good | Good |
| 8 | 0.20 | 0.10 | 0.15 | 0.15 | 0.01 | 0.10 | 0.03 | | Good | Very good | Good | Very good | Good |
| 9 | 0.20 | 0.10 | 0.15 | 0.15 | 0.03 | 0.10 | 0.05 | | Very good | Very good | Good | Good | Good |
| 10 | 0.20 | 0.10 | 0.31 | 0.15 | 0.03 | 0.10 | 0.05 | | Very good | Very good | Good | Good | Good |
| 11 | 0.20 | 0.10 | 0.31 | 0.10 | 0.01 | 0.08 | 0.05 | | Very good | Very good | Good | Good | Good |
| 12 | 0.10 | 0.05 | 0.20 | 0.10 | 0.01 | 0.06 | 0.02 | | Good | Good | Good | Very good | Good |
| 13 | 0.10 | 0.05 | 0.20 | 0.08 | 0.01 | 0.06 | 0.02 | | Good | Good | Good | Very good | Good |
| 14 | 0.10 | 0.05 | 0.20 | 0.08 | 0.01 | 0.06 | 0.03 | 0.00 | Good | Good | Good | Very good | Good |
| 15 | 0.10 | 0.05 | 0.20 | 0.08 | 0.01 | 0.06 | 0.03 | 0.05 | Good | Very good | Good | Very good | Good |
| 16 | 0.10 | 0.05 | 0.20 | 0.08 | 0.01 | 0.08 | 0.03 | 0.05 | Good | Very good | Good | Very good | Good |
| 17 | 0.20 | 0.10 | 0.31 | 0.15 | 0.03 | 0.10 | 0.05 | | Good | Very good | Good | Good | Good |
| 18 | 0.25 | 0.10 | 0.15 | 0.08 | 0.03 | 0.06 | 0.03 | | Good | Good | Good | Poor | Poor |
| 19 | 0.20 | 0.15 | 0.15 | 0.08 | 0.03 | 0.02 | 0.03 | | Good | Poor | Good | Poor | Poor |
| 20 | 0.05 | 0.10 | 0.20 | 0.45 | 0.03 | 0.02 | 0.02 | | Good | Poor | Good | Poor | Poor |
| 21 | 0.20 | 0.10 | 0.20 | 0.10 | 0.20 | 0.08 | 0.02 | | Good | Very good | Good | Poor | Poor |
| 22 | 0.05 | 0.10 | 0.31 | 0.30 | 0.03 | 0.008 | 0.05 | | Good | Poor | Good | Poor | Poor |
| 23 | 0.20 | 0.10 | 0.05 | 0.08 | 0.01 | 0.008 | 0.03 | | Good | Poor | Good | Good | Poor |
| 24 | 0.20 | 0.10 | 0.07 | 0.12 | 0.03 | 0.008 | 0.01 | | Good | Poor | Good | Very good | Poor |
| 25 | 0.20 | 0.10 | 0.02 | 0.18 | 0.01 | 0.008 | 0.001 | | Good | Poor | Good | Poor | Poor |

TABLE 2

Alloy Ingredients for Investigating Effects of Amount of Gas (mass %)

| Fe | Si | Cu | Mn | Cr | Ti | Zr | V | Extrudability | Evaluation |
|---|---|---|---|---|---|---|---|---|---|
| 0.1 | 0.08 | 0.03 | 0.1 | 0.01 | 0.08 | 0.03 | | Good | Good |

(Amount of gas: 0.21 cc/100 g)

TABLE 3

Amount of Gas in Used Alloy in Table 2 of Examples and Results of Evaluation of Extrudability

| No. | Amount of gas (cc/100 g) | Evaluation of extrudability |
|---|---|---|
| 1 | 0.35 | Large stripping and streaking of surface of extruded material |
| 2 | 0.28 | Large stripping |
| 3 | 0.25 | Fine stripping |
| 4 | 0.23 | Sound surface |
| 5 | 0.2 | sound surface, smooth roughness |
| 6 | 0.15 | Sound surface, smooth roughness, gloss |

Next, the homogenization conditions were verified. Various types of aluminum alloys which have the chemical compositions which are shown in No. 2, Table 1 were the cooling from 590° C. were performed under the following conditions. These billets will be called the "current treatment billets".

Temperature elevation conditions: 100° C./h
Cooling conditions: 250° C./h

As invention examples, such cast billets were heated to the homogenization temperature of 590° C. in the process of which (temperature elevation process) the temperature elevation rate was made 80° C./h or less. Furthermore, the billets were held at the homogenization temperature for 4 hours, then were cooled, during which it was cooled in the range of 450 to 350° C. by a 50° C./h cooling rate, then were cooled outside the furnace (allowed to cool outside the furnace). These billets will be called the "present invention billets".

If observing the microstructures of the current treatment billets and the present invention billets, the current treatment billets were not observed to have any notable compounds other than crystals of the billets before treatment, while the structure of the present invention billets were observed to have precipitates (Al—Mn-based) finely dispersed in addition to crystals.

Next, these two types of billets were made lengths of 500 mm and extruded by an extrusion ratio of 150 to produce flat tubes such as in FIG. 4 at 500° C. by a 15 m/min extrusion rate. At this time, the extrusion pressure at the time of extrusion was measured.

Figure 7:
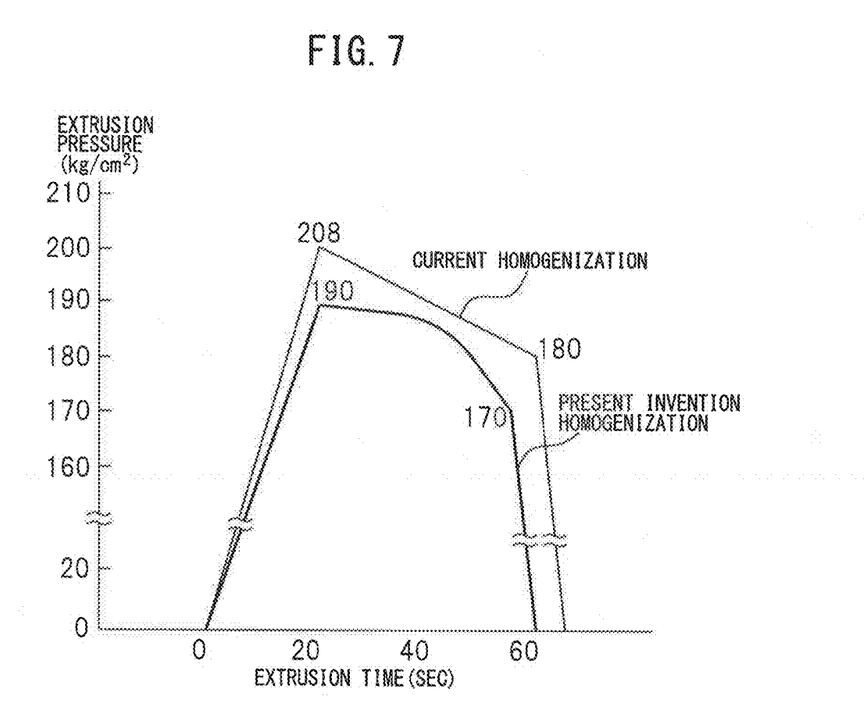
FIG. 7 compares pressure-time curves during extrusion of homogenized billets in the examples.

The results are shown in Table 4. Note that, FIG. 7 shows a comparison of pressure-time curves at the time of extrusion. The method of the present invention is smaller in highest pressure and faster in pressure drop compared with the current method. Further, it is learned that the area inside the cure is small and the energy which is required at the time of extrusion is small.

TABLE 4

Effects of Homogenizing Conditions

|  | Current homogenization | Invention homogenization |
|---|---|---|
| Microstructure of billet structure | Only crystals | Crystals + precipitates |
| Extrusion pressure | 210 kg/cm$^2$ Limit pressure of extruder capacity | 180 kg/cm$^2$ Extrusion 15% reduced from limit pressure |

Furthermore, the extrusion ratio at the time of extrusion was verified. The present invention billets which were used for verification of the homogenization conditions were heated to 480° C., then flat tubes of an extrusion ratio of 150 and flat bars of an extrusion ratio of 20 were extruded by a speed of 20 m/min. These type types of extruded materials were observed for microstructure and the states of dispersion of the Ti compounds were compared. The results are shown in Table 5.

TABLE 5

|  | Extrusion ratio 150 | Extrusion ratio 20 |
|---|---|---|
| Microstructure of extruded material | Crystal grains form fine structure | Crystal grains form fine structure |
| State of dispersion of Ti of extruded material | Distribution of Ti forms laminar dispersion along long direction of extruded material | Distribution of Ti thin and laminar dispersion difficult to recognize |

Depending on the extruded product, in the die design, as much as possible, the contact surfaces of the die and billet are effectively used. To improve the productivity, in the case of small objects, single dies are designed to extrude a plurality of products. Further, in large products, the product part is arranged at the parts near the outer circumference of the die. In the case of such die design, since the outer circumference of the billet forms the product from locations near the outer circumference of the die, if the oxide surface at the outer circumference of the billet and the unstable quality part down to about 1 mm from the outer circumference of the billet flow into the product, the surface of the extruded product ends up with entrained matter, stripping, streaks, and other trouble. To avoid this, it is effective to face mill the billet surface and then extrude the billet. The billet skin has to be removed by 0.1 to 1 mm or so in consideration of the concavities/convexities or so as to remove also the segregated locations of ingredients at the outer circumference of the billet.

The No. 2 invention alloy billet in Table 1 (amount of gas: 0.21 cc/100 g) was produced under suitable homogenization conditions. A billet with a relatively poor condition of billet skin was selected and tested. The surface conditions of the extruded material which was obtained under constant extrusion conditions were compared and evaluated from the state of stripping of FIG. 5 and streaks FIG. 6. The results are shown in Table 6.

TABLE 6

Effects of Face Milling of Billet

|  | No billet face milling | Billet face milling |
|---|---|---|
| State of stripping of extruded material | Remarkable from second billet | No stripping |
| State of streaks in extruded material (smoothness) | Roughness becomes uneven from end of first billet | Difference in gloss, but smoothness maintained |

Clearly, an effect is seen on the surface of the extruded material due to the skin of the billet. However, due to the number of tests, while not of an extent sufficient for deeming the product to be defective, the trouble increases and becomes greater along with continuous extrusion and the danger of resulting in defects is expected.

Industrial Applicability

According to the present invention, there are provided an aluminum alloy for microporous hollow shape material constituted by an aluminum alloy which keeps down the content of Cu which poses a problem in intergranular corrosion resistance, which maintains the natural potential noble, which adds transition metals which do not obstruct the extrudability, and which has an excellent corrosion resistance and extrudability.

The invention claimed is:

1. An aluminum alloy having a chemical composition consisting, by mass %, of Fe: 0.05 to 0.20%, Si: 0.10% or less, Cu: 0.15 to 0.32%, Mn: 0.08 to 0.10%, Zr: 0.02 to 0.03%, Ti: 0.06 to 0.15%, Cr: 0.01 to 0.03%, and the balance: Al and unavoidable impurities; wherein said aluminum alloy is cast into a billet and having a gas content in the alloy billet of 0.25 cc/100 g or less, wherein the aluminum alloy has a strength over 90 MPa when measured at room temperature.

2. A method for producing an aluminum alloy comprising: thermal homogenization by heating a DC cast billet of an aluminum alloy which has a chemical composition as set forth in claim 1 at a speed of 80° C./hour or less to 550 to 590° C., holding it there for 0.5 to 6 hours, then either holding it at 450 to 350° C. in range for 0.5 to 1 hour or cooling at a cooling rate of 50° C./hour down to 200° C. or less.

3. A method for producing an aluminum alloy according to claim 2, comprising: reheating said homogenization-treated billet to 450 to 550° C.; and then extruding it to a predetermined shape at an extrusion ratio of 30 to 1000.

4. A method for producing an aluminum alloy according to claim 3, further comprising: surface machining said homogenization-treated billet to a depth of about 0.1 to 1 mm in terms of the outer diameter; and then performing said extrusion.

5. The aluminum alloy according to claim 1, which contains Fe: in an amount of 0.05%.

6. A method for producing an aluminum alloy comprising: thermal homogenization by heating a DC cast billet of an aluminum alloy which has a chemical composition as set forth in claim 5 at a speed of 80° C./hour or less to 550 to 590° C., holding it there for 0.5 to 6 hours, then either holding it at 450 to 350° C. in range for 0.5 to 1 hour or cooling at a cooling rate of 50° C./hour down to 200° C. or less.

7. A method for producing an aluminum alloy according to claim 6, comprising: reheating said homogenization-treated billet to 450 to 550° C.; and then extruding it to a predetermined shape at an extrusion ratio of 30 to 1000.

8. A method for producing an aluminum alloy according to claim 7, further comprising: surface machining said homogenization-treated billet to a depth of about 0.1 to 1 mm in terms of the outer diameter; and then performing said extrusion.

9. The aluminum alloy according to claim 1, wherein the aluminum alloy is obtained by heating the alloy billet at a speed of 80° C./hour or less to 550 to 590° C., holding it there for 0.5 to 6 hours, then either holding it at 450 to 350° C. in range for 0.5 to 1 hour or cooling at a cooling rate of 50° C./hour down to 200° C. or less.

10. The aluminum alloy according to claim 1, wherein the gas content in the alloy billet is 0.23 cc/100 g or less.

11. An aluminum alloy having a chemical composition consisting, by mass %, of Fe: 0.05 to 0.20%, Si: 0.10% or less, Cu: 0.15 to 0.32%, Mn: 0.08 to 0.10%, Zr: 0.02 to 0.03%, Ti: 0.06 to 0.15%, Cr: 0.01 to 0.03%, V: more than 0 to less than 0.05%, and the balance: Al and unavoidable impurities; wherein said aluminum alloy is cast into a billet and having a gas content in the alloy billet of 0.25 cc/100 g or less, and an upper limit of the total amount of Ti and V is 0.20%.

12. The aluminum alloy according to claim 11, which contains Fe: in an amount of 0.05%.

13. A method for producing an aluminum alloy comprising: thermal homogenization by heating a DC cast billet of an aluminum alloy which has a chemical composition as set forth in claim 11 at a speed of 80° C./hour or less to 550 to 590° C., holding it there for 0.5 to 6 hours, then either holding it at 450 to 350° C. in range for 0.5 to 1 hour or cooling at a cooling rate of 50° C./hour down to 200° C. or less.

14. A method for producing an aluminum alloy according to claim 13, comprising: reheating said homogenization-treated billet to 450 to 550° C.; and then extruding it to a predetermined shape at an extrusion ratio of 30 to 1000.

15. A method for producing an aluminum alloy according to claim 14, further comprising: surface machining said homogenization-treated billet to a depth of about 0.1 to 1 mm in terms of the outer diameter; and then performing said extrusion.

16. The aluminum alloy according to claim 11, wherein the aluminum alloy has a strength over 90 MPa when measured at room temperature.

17. The aluminum alloy according to claim 11, wherein the aluminum alloy has an exfoliation corrosion of 100 μm or less.

18. An aluminum alloy having a chemical composition consisting, by mass %, of Fe: 0.05 to 0.20%, Si: 0.10% or less, Cu: 0.15 to 0.32%, Mn: 0.08 to 0.10%, Zr: 0.02 to 0.03%, Ti: 0.06 to 0.15%, Cr: 0.01 to 0.03%, and the balance: Al and unavoidable impurities; wherein said aluminum alloy is cast into a billet and having a gas content in the alloy billet of 0.25 cc/100 g or less wherein the aluminum alloy has an exfoliation corrosion of 100 μm or less.

19. The aluminum alloy according to claim 18, wherein the aluminum alloy has a strength over 90 MPa when measured at room temperature.

20. The aluminum alloy according to claim 18, wherein the gas content in the alloy billet is 0.23 cc/100 g or less.

* * * * *